US011055918B2

(12) United States Patent
Arroyo Palacios et al.

(10) Patent No.: US 11,055,918 B2
(45) Date of Patent: Jul. 6, 2021

(54) VIRTUAL CHARACTER INTER-REALITY CROSSOVER

(71) Applicant: Sony Interactive Entertainment Inc., Tokyo (JP)

(72) Inventors: Jorge Arroyo Palacios, San Mateo, CA (US); Steven Osman, San Mateo, CA (US); Richard Marks, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/355,627

(22) Filed: Mar. 15, 2019

(65) Prior Publication Data

US 2020/0294313 A1  Sep. 17, 2020

(51) Int. Cl.
*G06T 19/00* (2011.01)
*G06T 13/40* (2011.01)
(Continued)

(52) U.S. Cl.
CPC ............ *G06T 19/006* (2013.01); *G06T 13/40* (2013.01); *G06T 17/00* (2013.01); *A63F 13/358* (2014.09); *A63F 13/52* (2014.09); *A63F 13/77* (2014.09); *A63F 2300/209* (2013.01); *A63F 2300/534* (2013.01); *A63F 2300/66* (2013.01); *G06T 2210/21* (2013.01)

(58) Field of Classification Search
CPC ....... G06T 19/006; G06T 13/40; G06T 17/00; A63F 13/358; A63F 13/52; A63F 13/77
See application file for complete search history.

(56) References Cited

U.S. PATENT DOCUMENTS 9,761,045 B1 * 9/2017 Cote ..................... G06T 17/10
2011/0242134 A1 * 10/2011 Miller ................... G06F 3/011
345/633
(Continued)

FOREIGN PATENT DOCUMENTS

WO    2016 014876 A1    1/2016

OTHER PUBLICATIONS

Arroyo-Palacios, Jorge et al., [POSTER] "Believable Virtual Characters for Mixed Reality," 2017 IEEE International Symposium on Mixed and Augmented Reality Adjunct Proceedings (3 pgs).
(Continued)

*Primary Examiner* — Ariel A Balaoing
(74) *Attorney, Agent, or Firm* — Penilia IP, APC

(57) ABSTRACT

A method is provided, including the following operations: presenting on a display device a virtual scene including a virtual character, the display device disposed in a local environment; providing a view of the local environment through a head-mounted display, the view through the head-mounted display including the display device and the virtual scene being presented thereon; animating the virtual character to show the virtual character moving from the virtual scene presented on the display device to the local environment as viewed through the head-mounted display, wherein the animating includes transitioning, from rendering the virtual character as part of the virtual scene presented on the display device, to rendering the virtual character as an augmented element in the view of the local environment provided through the head-mounted display.

18 Claims, 13 Drawing Sheets

(51) Int. Cl.
*G06T 17/00* (2006.01)
*A63F 13/358* (2014.01)
*A63F 13/52* (2014.01)
*A63F 13/77* (2014.01)

(56) References Cited

U.S. PATENT DOCUMENTS

| | | | | |
|---|---|---|---|---|
| 2011/0304646 | A1* | 12/2011 | Kato | A63F 13/10 345/632 |
| 2012/0124509 | A1* | 5/2012 | Matsuda | G02B 27/017 715/782 |
| 2013/0194278 | A1* | 8/2013 | Zajac, III | A63F 13/10 345/473 |
| 2013/0257899 | A1* | 10/2013 | Baron | G06F 30/00 345/619 |
| 2013/0290876 | A1* | 10/2013 | Anderson | G06T 19/006 715/761 |
| 2014/0002442 | A1* | 1/2014 | Lamb | G06F 3/1431 345/419 |
| 2014/0320389 | A1* | 10/2014 | Scavezze | G06T 19/006 345/156 |
| 2014/0333666 | A1* | 11/2014 | Poulos | G06F 3/147 345/633 |
| 2014/0368537 | A1* | 12/2014 | Salter | G06F 3/011 345/633 |
| 2015/0205106 | A1* | 7/2015 | Norden | G02B 27/017 345/7 |
| 2016/0027214 | A1* | 1/2016 | Memmott | G02B 27/0172 345/633 |
| 2016/0054837 | A1* | 2/2016 | Stafford | G02B 27/017 463/33 |
| 2016/0313790 | A1* | 10/2016 | Clement | G06F 3/011 |
| 2016/0364907 | A1* | 12/2016 | Schoenberg | G06T 17/205 |
| 2017/0249019 | A1* | 8/2017 | Sawyer | G02B 27/0179 |
| 2018/0004286 | A1* | 1/2018 | Chen | G02B 27/017 |
| 2018/0005441 | A1* | 1/2018 | Anderson | A63F 13/655 |
| 2018/0034867 | A1 | 2/2018 | Zahn et al. | |
| 2020/0051337 | A1* | 2/2020 | Reynolds | G06F 3/011 |

OTHER PUBLICATIONS

Bailenson, Jeremy N. et al., "Does a Digital Assistant Need a Body? The Influence of Visual Embodiment and Social Behavior on the Perception of Intelligent Virtual Agents in AR" (10 pgs).

PCT International Search Report and Written Opinion of the International Searching Authority issued in corresponding International Patent Application No. PCT/US2020/017493 dated May 13, 2020 (PCT Forms ISA 220, 210, 237) (14 total pages).

* cited by examiner

VIRTUAL CHARACTER INTER-REALITY CROSSOVER

FIELD OF THE DISCLOSURE

The present disclosure relates to systems and methods for a virtual character to exhibit an inter-reality crossover.

BACKGROUND

Description of the Related Art

A current area of rapidly growing technology is the field of virtual reality and augmented reality, often in relation to video gaming, now encompassing a multitude of gaming and interactive application platforms, including dedicated gaming consoles, personal computers (PC), and more recently, cloud application/gaming and mobile devices. One example of a networked gaming service/system is the PlayStation® Network, which includes various gaming services supporting both console-based and cloud-based gaming.

It is within this context that embodiments of the disclosure arise.

SUMMARY OF THE DISCLOSURE

Implementations of the present disclosure provide methods and systems for a virtual character to exhibit an inter-reality crossover.

In some implementations, a method is provided, including the following operations: presenting on a display device a virtual scene including a virtual character, the display device disposed in a local environment; providing a view of the local environment through a head-mounted display, the view through the head-mounted display including the display device and the virtual scene being presented thereon; animating the virtual character to show the virtual character moving from the virtual scene presented on the display device to the local environment as viewed through the head-mounted display, wherein the animating includes transitioning, from rendering the virtual character as part of the virtual scene presented on the display device, to rendering the virtual character as an augmented element in the view of the local environment provided through the head-mounted display.

In some implementations, the view through the head-mounted display is provided from an externally facing camera of the head-mounted display.

In some implementations, the method further includes: generating a 3D model of the local environment; wherein rendering the virtual character as an augmented element in the view of the local environment includes using the 3D model of the local environment to determine placement of the virtual character in the view of the local environment.

In some implementations, rendering the virtual character as an augmented element in the view of the local environment includes using the 3D model of the local environment to detect virtual collisions of the virtual character with one or more objects in the local environment.

In some implementations, rendering the virtual character as an augmented element in the view of the local environment includes using the 3D model of the local environment to define permissible locations or movements of the virtual character in the view of the local environment.

In some implementations, generating the 3D model of the local environment includes scanning the local environment with a depth sensing device of the head-mounted display.

In some implementations, the transitioning includes, identifying the display device in the view of the local environment, and rendering the virtual character in proximity to the display device in the view of the local environment.

In some implementations, rendering the virtual character in proximity to the display device includes animating the virtual character in the view of the local environment as emerging from the display device into the local environment.

In some implementations, the transitioning includes, identifying in the view of the local environment the virtual scene that is presented on the display device, and rendering the virtual character in proximity to the virtual scene in the view of the local environment.

In some implementations, the animating the virtual character is responsive to input from a controller device.

In some implementations, a non-transitory computer readable medium is provided, having program instructions that, when executed by a computing device, cause said computing device perform a method including the following: presenting on a display device a virtual scene including a virtual character, the display device disposed in a local environment; providing a view of the local environment through a head-mounted display, the view through the head-mounted display including the display device and the virtual scene being presented thereon; animating the virtual character to show the virtual character moving from the virtual scene presented on the display device to the local environment as viewed through the head-mounted display, wherein the animating includes transitioning, from rendering the virtual character as part of the virtual scene presented on the display device, to rendering the virtual character as an augmented element in the view of the local environment provided through the head-mounted display.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Broadly speaking implementations of the present disclosure are drawn to an interactive virtual/augmented character that is viewable through a head-mounted display. In several implementations the virtual character is configured to move between a scene that is rendered on a display device in a local environment, and the local environment itself as seen through a head-mounted display. In some implementations the virtual character is capable of interacting with smart devices or IOT devices, such as by controlling them to turn on or off or perform other functions. In still other implementations, various techniques are employed to enable the virtual character's presence to be comprehended by other users in the local environment that are not able to see the virtual character through a head-mounted display. For example, audio of the virtual character, such as the virtual characters voice, can be rendered through local speaker systems.

Figure 1:
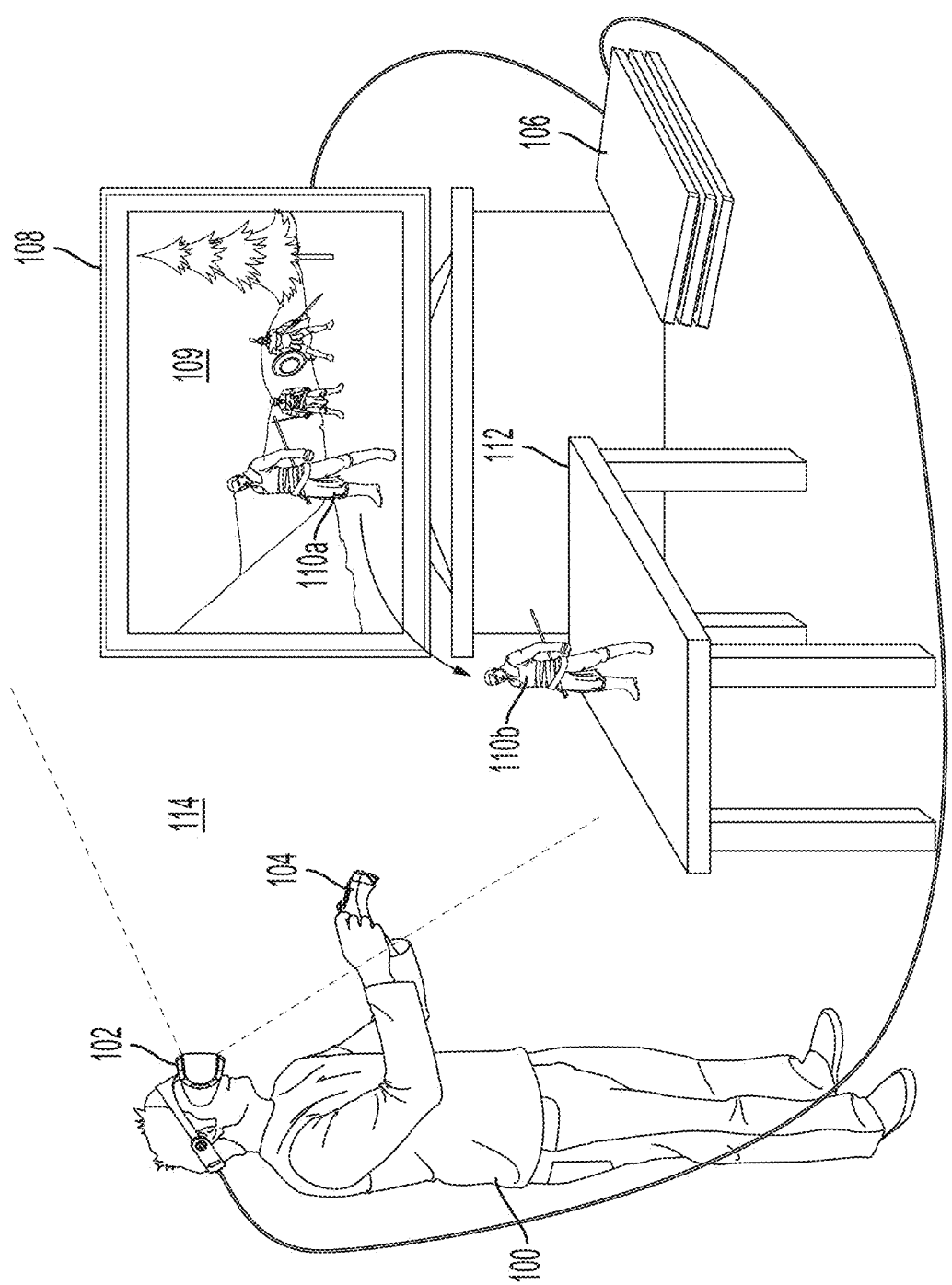
FIG. 1 illustrates a system for enabling viewing of a virtual character in multiple contexts, in accordance with implementations of the disclosure.

FIG. 1 illustrates a system for enabling viewing of a virtual character in multiple contexts, in accordance with implementations of the disclosure. In the illustrated implementation, a user 100 is viewing a local environment 114 through a head-mounted display 102. In the local environment 114 a display device 108 is situated. By way of example without limitation, the display device 108 can be a television, monitor, LCD display, projector screen, tablet, laptop, or any other device having a physical display screen on which interactive content can be rendered.

As shown, a scene 109 is rendered on the display device 108 and this scene includes a virtual character 110a. The scene 109 that is rendered on the display device 108 can be from a video game, simulation, interactive application, or other interactive media. For example, in some implementations a computing device 106 can execute an interactive application that generates the image data that is rendered to the display device 108 to enable the display of the scene 109. In various implementations, the computing device 106 can be a game console, personal computer, laptop, set-top box, or any other type of computing device capable of executing an interactive application to provide the functionality described herein. In some implementations, the functionality of the computing device 106 is incorporated into one or both of the display device 108 or the head-mounted display 102. In some implementations, the functionality of the computing device is divided amongst two or more separate devices that communicate with each other.

As noted, the virtual character 110a is a part of the scene 109 rendered on the display device 108. That is, the virtual character 110a is contextually a member of the scene 109 and does not appear to physically interact with objects in the local environment 114. In this sense, the virtual character 110a is viewable by not only the user 100 in the local environment 114, but by any other person that may be viewing but display 108. It will be appreciated that as the user 100 is wearing a head-mounted display 102, the user 100 may be able to view the display 108 through the head-mounted display 102 via an externally facing camera of the head-mounted display 102. In some implementations the head-mounted display 102 is inherently see-through, configured as augmented reality glasses or goggles, and capable of rendering objects in the user's view.

To provide a more interactive experience, in some implementations the virtual character is animated in such a fashion as to appear to emerge from the display device 108 into the local environment 114. That is, as viewed by the user 100 through the head-mounted display 102, the virtual character 110a can appear to pop out of the scene 109 into the local environment 114, where the virtual character is now rendered as an augmented reality object in the local environment. In the illustrated implementation, the virtual character that has emerged from the scene 109 is shown as virtual character 110b.

In order to accomplish such an effect, a coordinated series of animations on the display device 108 and via the head-mounted display 102 are performed. For example, the virtual character 110a can be animated so as to appear to move towards the region of the local environment 114 in front of the display device 108. In some implementations, this can entail movement of the virtual character 110a towards the bottom of the display device 108. In some implementations, the virtual character 110a may be animated so as to disappear into a region along the bottom of the display device 108. Continuous with this animation of the virtual character 110a on the display device 108, the virtual character 110b is animated on the head-mounted display 102 so as to be shown emerging from the display device 108. It will be appreciated that the virtual character 110b is the same virtual character as virtual character 110a, but now being rendered as an augmented reality object in the local environment 114 and viewable through the head-mounted display 102. Does the user 100 is provided a view through the head-mounted display 102 that shows the virtual character 110b augmented into the local environment 114.

The coordinated animations of the virtual character on the display device 108 and the head-mounted display 102 can be substantially simultaneous, overlapping, continuous, or proximate in time to each other, provided that together they provide to the user 100 the illusion of the virtual character transitioning from the scene 109 into the local environment 114. It will be appreciated that once the virtual character is seen as in the local environment 114, that the virtual character is no longer a part of the scene 109 that is shown on the display device 108, and will no longer appear to physically interact with objects in the scene 109. Instead, the virtual character 110b can be configured to appear to interact with objects in the local environment 114. To accomplish this, in some implementations, a three-dimensional mapping of the local environment is captured and utilized to enable the virtual character 110b to be rendered in a manner that respects the physical spaces occupied by the objects in the local environment 114. By way of example, in the Illustrated implementation the virtual character 110b is shown being rendered on the surface of a table 112 in the local environment 114.

It will be appreciated that in various implementations, the particular style or details of the animations of the virtual character can vary. For example, in some implementations the animations provide an effect whereby the virtual character appears to slide out from an edge of the display screen of the display device 108 and into the local environment 114. In some implementations, the animations of the virtual character 110a and the virtual character 110b are coordinated so that when the virtual character is moving from the scene 109 into the local environment 114, a portion of the virtual character is represented by the rendering of the virtual character 110a on the display device 108 while simultaneously the other portion of the virtual character is represented by the rendering of virtual character 110b through the head-mounted display 102. And during the course of the transition of the virtual character from the scene 109 to the local environment 114, the portion represented by virtual character 110a decreases as the portion represented by virtual character 110b increases. In some implementations, the virtual character may appear to pop out from the display screen of the display device 108. In such implementations, by way of example, the virtual character 110a can be shown on the display screen and the virtual character 110b simultaneously shown (via the head-mounted display 102) in proximity or adjacent to the display screen so as to provide the effect of the virtual character moving through the display screen into the local environment 114.

In some implementations, as the virtual character moves from display to display, its rendering or clarity can be adjusted. For example, the TV (display device 108) version of the character could be more pixelated or virtual looking, so that when it jumps out of the TV into the AR world, the virtual character's rendering could be improved so that it appears to become more real. A similar concept can be applied to the sound generated by the character, as well. The audio of the virtual character can be configured to sound different if it has to travel through multiple mediums, such as from the display device 108 to the local environment 114.

In some implementations, the head mounted display 102 receives image data from the same computing device 106 that also renders image data to the display device 108. In such implementations, the computing device 106 coordinates the animations of the virtual characters 110a on the display device 108 and 110b on the head-mounted display 102 to enable the transitioning of the virtual character from the scene 109 to the local environment 114 as described. As noted above, the computing device 106 may execute an interactive application, and the interactive application can be configured to both render the scene 109 on the display device 108 as well as render augmented reality content on the head-mounted display 102.

In some implementations the system is configured to use the rendering on the display device 108, to improve the AR tracking, including the tracking of the HMD and the AR animation of the virtual character. In a sense, the images rendered on the display device 108 can serve as a form of AR marker that can be recognized and tracked (e.g. through externally facing cameras of the HMD). However, unlike typical AR markers which are usually obvious to users in the local environment, in this case the system can track the specific content rendered on the display device, since the specific content is known. Thus, the specific content rendered on the display device can be another visual anchor in the local environment, for improving localization of the HMD position/orientation, and also improving rendering of the virtual character to ensure that the character is appropriately rendered with respect to the TV and what is on it. In some instances, this can ensure that placement of the virtual character relative to the TV is proper, even if other portions of the AR tracking system experience mistakes or difficulties in tracking.

Additionally, the content on the display device can be leveraged to provide higher quality rendering of the AR character. For instance, since the content displayed on the TV display is known, it is possible to generate higher resolution reflections of that content on the AR character. By contrast, if only images from some pass-through camera (e.g. externally facing on the HMD) are utilized to determine reflections, then it would be limited by what the pass-through camera sees. An example will serve to illustrate the concept. Imagine the HMD user with the TV on their left, and the AR character on their right. As the user's head turns from left to right, the user may not see the TV any more, but would still be able to see a sharp, animated reflection of the TV image on the character, as the content being displayed on the TV is known. Similarly, as the character moves closer to the TV it is possible to cast appropriate shadows of the TV's light due to the character, using the knowledge of the content that is displayed on the TV.

In additional implementations, the content rendered to the TV (display device 108) can be deliberately authored so that the TV produces a desired lighting effect that would affect the appearance of the character. For example, to add a colored glow to the character, the system can be configured to render content on the TV that is substantially of the desired color (e.g. to add a green glow to the character, then render content that is green). The overall color effect would be coherent since there is a colored light source present, and would provide a colored glow to the character.

In some implementations, the virtual character can be controlled by the user 100. For example, the user 100 may operate a controller device 104 that communicates with the computing device 106 to provide input that is processed by the interactive application to control the movement of the virtual character. In response to such input, the interactive application can be configured to trigger the transition of the virtual character from the scene 109 into the local environment 114 as has been described. As noted, in some implementations the interactive application can be a video game, in which case the ability of the virtual character to be controlled to move from the scene 109 into the local environment 114, and back again, can provide an additional level of interactivity to the video game.

While the virtual character has been described as emerging from the display device 108 into the local environment 114, it will be appreciated that the reverse process can occur, whereby the virtual character is animated so as to appear to move from the local environment 114 into the scene 109 that is rendered on the display device 108. As such, any of the described animations can be performed in reverse order to accomplish such a transition from the local environment 114 into the scene 109.

Figure 2:
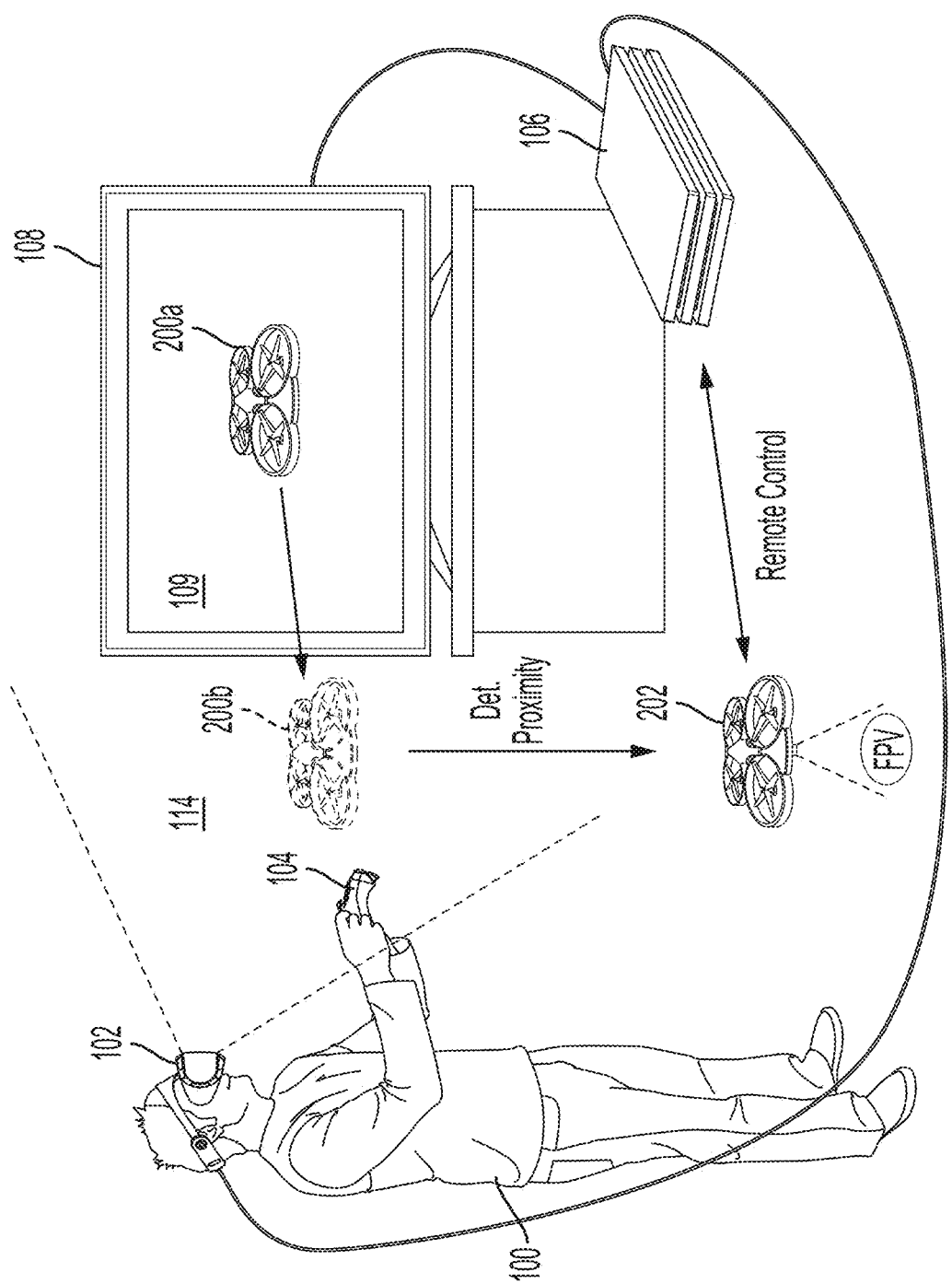
FIG. 2 illustrates a system whereby a virtual vehicle is configured to emerge from a display device into a local environment and further effect remote control of a real vehicle in the local environment, in accordance with implementations of the disclosure.

It will be appreciated that in addition to virtual characters, any other type of virtual object can be animated so as to emerge from a display device into a local environment in accordance with various implementations of the disclosure. By way of example, FIG. 2 illustrates a system whereby a virtual vehicle is configured to emerge from a display device into a local environment and further effect remote control of a real vehicle in the local environment, in accordance with implementations of the disclosure. In the illustrated implementation, a drone 200a is shown being rendered on the display device 108. The drone 200a as such is part of the scene 109 that is rendered by the computing device 106 to the display device 108, for example from an interactive application that is executed by the computing device 106 in some implementations.

Similar to the virtual character animation described above, the drone can be animated so as to appear to the user 100 to be emergent from the display device 108 into the local environment 114. For example, the drone 200a can be animated so as to appear to move towards the region of the local environment 114 on the front side of the display device 108 or toward an edge of the display screen of the display device 108. And contemporaneously, a corresponding drone 200b can be animated as an augmented reality object seen through the head-mounted display 102, that emerges from the display device 108, so as to provide the illusion that the drone 200a is moving from the scene 109 of the display device 108 into the local environment 114. Thus, the drone 200a in the scene 109 transitions from the scene 109 into the local environment 114 where it is represented by the drone 200b as an augmented reality object viewed through the head-mounted display 102.

In some implementations, the movements of the drone are controllable by the user 100, for example in response to input supplied via the controller device 104. Thus the user 100 may provide input to control movements of the drone 200a in the scene 109 on the display device 108. The user 100 may also provide input causing the drone 200a to emerge from the scene 109 into the local environment 114, represented as drone 200b in the user's view on the head-mounted display 102. It will be appreciated that as the drone transitions from the display device 108 into the local environment 114 as an augmented reality object, so the user's control of the drone (via the controller device 104 for example) also transitions from controlling it in the scene 109 to controlling the drone 200b and its movements in the context of the local environment 114.

In some implementations, the control of a virtual object by a user can be transferred to enable control of a real object in the local environment. By way of example, in the illustrated implementation the control of the virtual drone 200b can be transferred to enable the user 100 to control a real drone 202 in the local environment 114. In some implementations, such transfer of control can be effected in response to detecting proximity of the virtual object to the real object. For example, in the illustrated implementation, when the virtual drone 200b is maneuvered or landed in proximity to or on top of the real drone 202, then the user's control of the virtual drone 200b may transition to the real drone 202 so that the user 100 may now control movement of the real drone 202, for example using the controller device 104. It will be appreciated that to enable such transfer of remote control functionality, the real drone 202 can be configured to communicate with and receive commands from the computing device 106. And thus the computing device 106 can receive input from the controller device 104 and apply such input to the real drone 202 so as to enable remote control of the real drone 202 in the local environment 114. Furthermore, additional functionality related to the real object being controlled can also be provided. For example, first person viewing functionality can be provided from the real drone 202, such that a first person view is rendered on the head-mounted display 102 as provided from a camera of the drone 202. That is, in some implementations the Computing device 106 may receive a video feed from the drone 202, and then render the video feed to the head-mounted display 102. In this manner, the user's experience can transition from control of a virtual object to control of a real object, and even the sensation of inhabiting the real object.

In some implementations, maneuvering a virtual object in the local environment 114 in proximity to a real object that may also be controlled, may trigger presentation of a selectable option for the user 100 to be able to transfer control from the virtual object to the real object.

Figure 3:
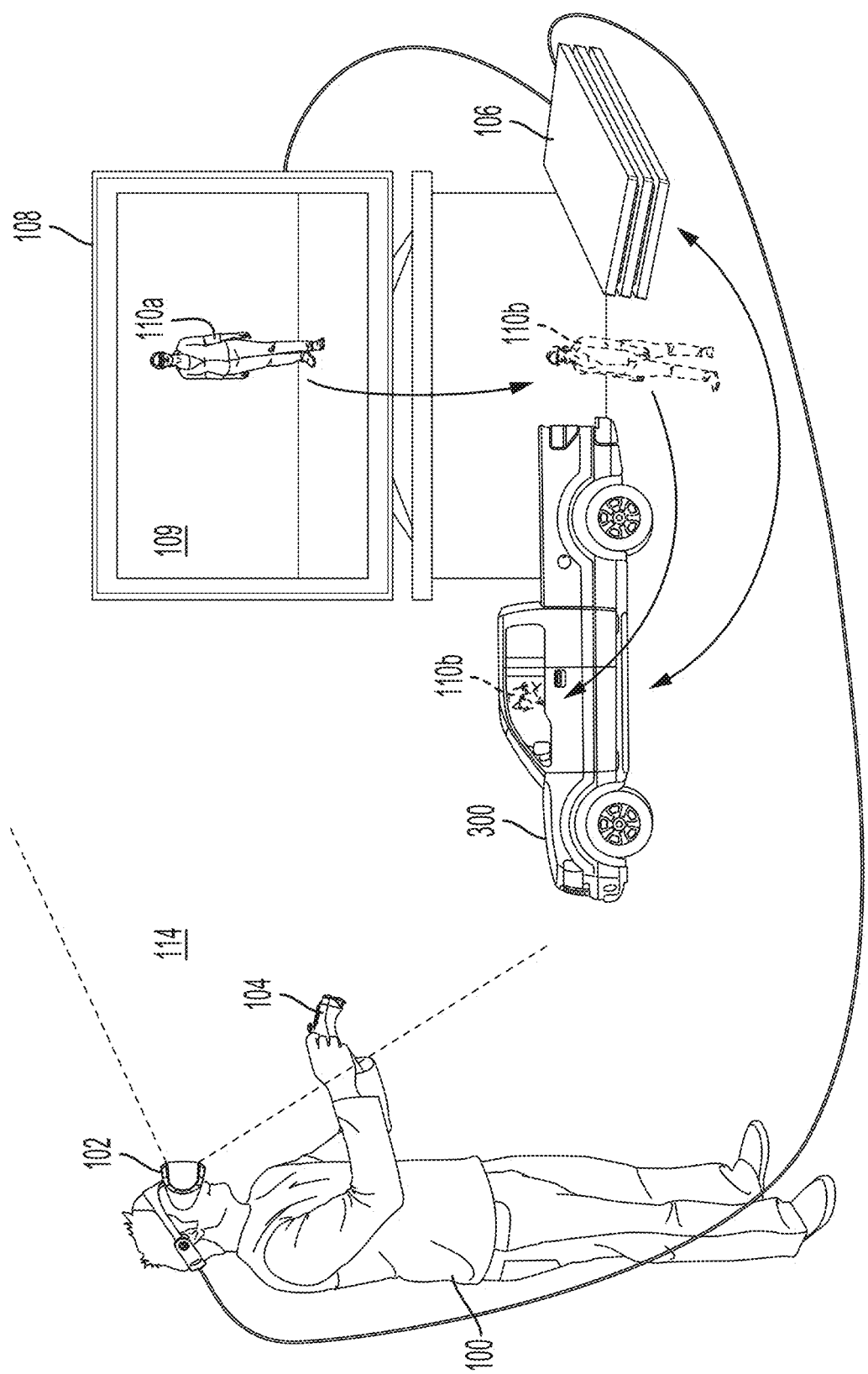
FIG. 3 illustrates a scenario in which control of a virtual character is transferred to enable remote control of a real object in the local environment, in accordance with implementations of the disclosure.

FIG. 3 illustrates a scenario in which control of a virtual character is transferred to enable remote control of a real object in the local environment, in accordance with implementations of the disclosure. In the illustrated implementation, the virtual character 110a is animated so as to move from the scene 109 rendered on the display device 108 into the local environment 114, where the virtual character is represented as virtual character 110b, and viewable through the head-mounted display 102 worn by the user 100. The virtual character 110b can be maneuvered by the user 100 in the context of the local environment 114, as previously described, for example based on input supplied from the controller device 104.

In some implementations, in response to maneuvering the virtual character 110b proximate to a real vehicle 300 (e.g. a remote control car) in the local environment 114, the virtual character 110b can be rendered as entering the vehicle 300. In some implementations, the virtual character 110b can be animated so as to show the virtual character 110b climbing into the vehicle 300. As shown, the virtual character 110b is now sitting in the vehicle 300, and in some implementations the control of the virtual character 110b can be transitioned to remote control of the vehicle 300 in the local environment 114. That is, the user 100 operating the controller device 104 to maneuver the virtual character 110b, may now use the controller device 104 to control movements of the vehicle 300 in the local environment 114. In this manner, a virtual character may appear to emerge from the display device 108 and enter or inhabit a real-world object and take control of that real-world object, in this case the vehicle 300.

It will be appreciated that as the vehicle 300 is remotely controlled by the user 100, so the virtual character 110b is animated to remain at its relative position within the vehicle 300. In some implementations, this coordination of the animation of the virtual character 110b with the real-world movements of the vehicle 300, can be enabled in part by using the received commands from the controller device 104 (that control the vehicle 300) along with visual tracking of the vehicle 300 in the local environment 114, to enable proper placement of the virtual character 110b in the field of view of the user 100 on the head-mounted display 102. Furthermore, in some implementations the virtual character 110b can be animated in a manner demonstrative of its apparent control of the vehicle 300, for example by showing the virtual character 110b maneuvering a steering wheel of the vehicle 300. As such, the virtual character 110b can appear to be driving the vehicle 300. As with the implementation discussed above, a first person view from the perspective of the vehicle 300 can be provided from a video feed of a camera that is included in the vehicle 300.

Figure 4:
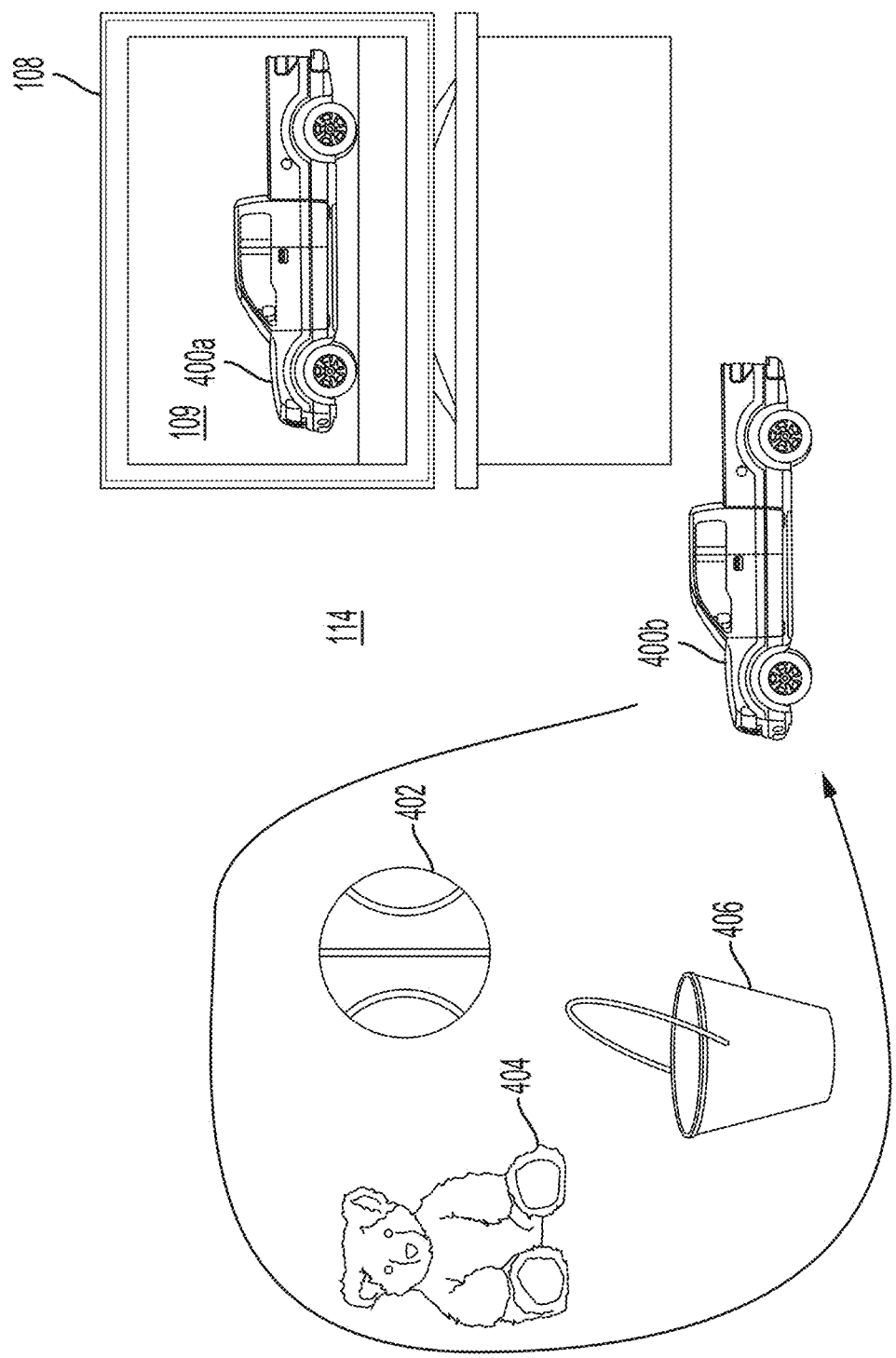
FIG. 4 illustrates a virtual object emerging from a display device into a local environment and navigating within the local environment, in accordance with implementations of the disclosure.

FIG. 4 illustrates a virtual object emerging from a display device into a local environment and navigating within the local environment, in accordance with implementations of the disclosure. In The illustrated implementation, the virtual object 400a is shown as being a vehicle, but in other implementations may be a character or any other virtual object. As shown, and in accordance with principles discussed herein, the virtual object 400a is animated so as to appear to transition out of the scene 109 presented on the display device 108 and into the local environment 114, where it is represented as an augmented reality object, specifically the virtual object 400b.

It will be appreciated that the virtual object 400b being set within the context of the local environment 114, can be configured to respect the spatial integrity of the local environment 114 and other physical objects set therein. For example, the virtual object 400b can be configured to be shown as resting on a surface such as the floor in the local environment. Further, collisions between the virtual object 400b and real objects in the local environment 114 can occur, and the rendering of the virtual object 400b can be responsive to such collisions. For example, in some implementations, the virtual object 400b will not be rendered so as to occupy a spatial region that is already occupied by a physical object in the local environment 114. When a collision occurs with a real object, the virtual object 400b may stop or be prevented from moving into a spatial region occupied by a real object, or may be rendered as being deflected from the real object. In the illustrated implementation, real object such as a ball 402, a stuffed animal 404, and a bucket 406 are shown. Thus the virtual object 400b will not be rendered so as to occupy the same space in the local environment 114 that is occupied by these objects. Furthermore, by respecting the spatial integrity of the real objects, this means that the virtual object 400b can be occluded by the real objects in the local environment. For example, if the virtual object 400b moves behind the ball 402, then it will be occluded by the ball 402. Likewise, the virtual object 400b can be rendered to occlude real objects in the local environment 114.

In some implementations, the virtual object 400b can be controlled by the user as has been previously discussed. This can provide to the player an enhanced interactive experience as the virtual object can be configured to interact both in the scene 109 and in the context of the real local environment 114. For example, in the case of a vehicle, the vehicle can be controlled in the scene 109, then emerge from the scene 109 into the local environment 114, and further be driven around the local environment 114, while respecting the spatial integrity and boundaries of physical objects in the local environment. The vehicle can also be driven from the local environment 114 back into the scene 109.

In other implementations, the virtual object 400b may be controlled by the interactive application itself, for example as a non-player entity such as a non-player character or vehicle. In such implementations, the virtual object's 400b actions can be guided by a component of the interactive application or an artificial intelligence implementation . As such, the virtual object 400b may automatically navigate the local environment 114, including possibly avoiding collision with real objects in the local environment.

Figure 5:
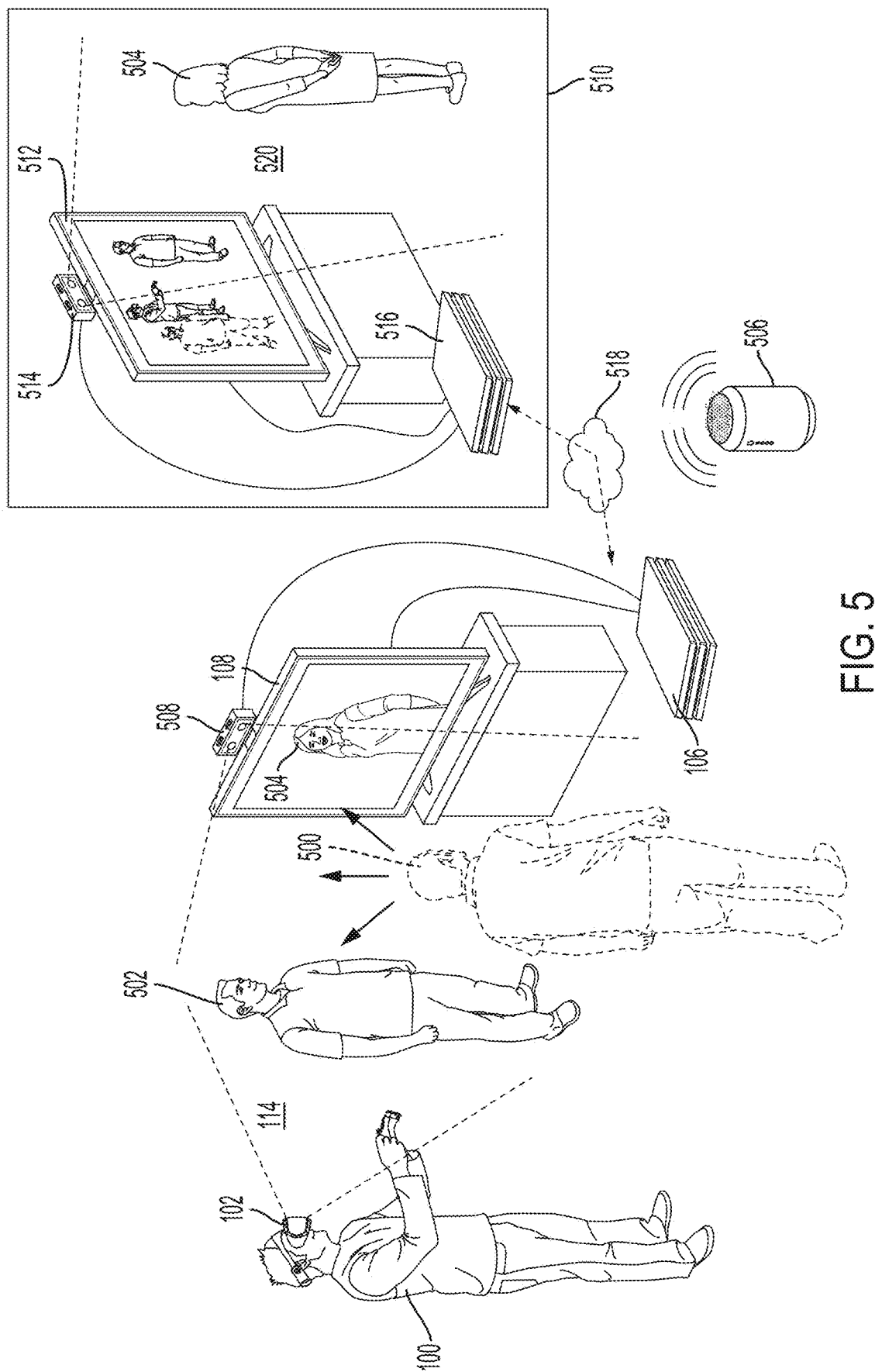
FIG. 5 illustrates a virtual character configured to interact in a local environment, in accordance with implementations of the disclosure.

FIG. 5 illustrates a virtual character configured to interact in a local environment, in accordance with implementations of the disclosure. As shown in the illustrated implementation, the virtual character 500 is an augmented reality character or object that can be viewed, for example, by the user 100 through the head-mounted display 102.

In order to enhance the interactive believability of the virtual character 500, in some implementations the virtual character 500 can be configured to exhibit actions that are indicative of awareness of persons or things in the local environment 114. For example, persons in the local environment 114 can be detected, and the virtual character 500 can be configured to turn towards or look towards such persons in response to detected actions such as speech, looking (e.g. towards the virtual character), movements, gestures, etc. Thus by way of example, if the user 100 speaks or looks towards the virtual character 500 in the local environment 114, then the virtual character 500 can be configured to look back towards the user 100, such as by moving its eyes, turning its head, or shifting its body towards (or to face) the user 100. Similarly, if another person 502 in the local environment 114 exhibits detected activity such as speaking or gesturing, then the virtual character 500 can be configured to exhibit an awareness of such activity and respond appropriately, such as by looking towards the person 502.

The apparent awareness of persons by the virtual character 500 can further extend to recognition of persons shown on a display device, such as the person 504 shown on display device 108. Thus, for example, in response to speech/noise or gestures/movements by the person 504, the virtual character 500 may be configured to look towards the person 504 on the display device 108 or exhibit other actions indicating awareness.

In order for the virtual character 500 to exhibit awareness of persons, it will be appreciated that such persons and their positions in the local environment need to be detected. This can be accomplished using several mechanisms, alone or in combination with each other. In the case of the user 100 that is wearing the head-mounted display 102, the position of the head-mounted display 102 is tracked in the local environment 114, and this position can be used to identify the position of the user 100. In some implementations, an externally facing camera of the head-mounted display is used to determine the position of the head-mounted display in the local environment (e.g. using simultaneous localization and mapping (SLAM) techniques). And in some implementations, a separate image capture device 508 can be used to visually track the head-mounted display 102, such as by tracking markers on the head-mounted display.

In the case of the person 502, identification and tracking of the person 502 can be accomplished using the video feed from the externally facing camera of the head-mounted display 102, and/or the video feed from the image capture device 508, both of which capture images of the local environment 114. The person 504 shown on the display device 108 can be recognized using the externally facing camera of the head-mounted display 102, but may also be recognized by the computing device 106 more directly by analyzing the video that is to be rendered on the display device 108. To facilitate recognition of persons, whether physically present in the local environment 114 or shown on the display device 108, a machine learning classifier can be employed.

In some implementations, the person 504 that is shown on the display device 108 is on a video conference call. That is, as shown at reference 510, the person 504 is at a remote location from the user 100, and a video conference call is established between their locations. For example, a video feed of the local environment 114 from the image capture device 508 is transmitted (e.g. over a network 518) by the computing device 106 to a corresponding computing device 516 at the remote location where the person 504 is situated, and the video feed of the local environment 114 is rendered to a display device 512 for viewing by the person 504 Likewise, a video feed from an image capture device 514 that captures the local environment 520 of the person 504, is transmitted from the computing device 516 over the network 518 to the computing device 106, which renders the video feed to the display device 108.

As noted, the virtual character 500 can be configured to react to the presence of the person 504 shown on the display device 108. Furthermore, in some implementations the virtual character 500 can be configured to be viewable by the person 504 on their display device 512. For example, the video feed from the image capture device 508 can be augmented with the virtual character 500, by either of the computing device 106 or the computing device 516, so as to show the virtual character 500 on the display device 512. In this way, the person 504 will experience the interactivity with the virtual character 500, which is also seen by the user 100 via their head-mounted display 102.

It will be appreciated that the person 502 in the local environment 114 is not able to see the virtual character 500, as the person 502 is not wearing a head mounted display or accessing other hardware capable of visualizing the virtual character 500. Therefore, to provide the person 502 with a sense of the presence of the virtual character 500, sounds such a speech or other sounds which are attributable to the virtual character 500 can be rendered through a speaker 506 in the local environment 114.

Figure 6:
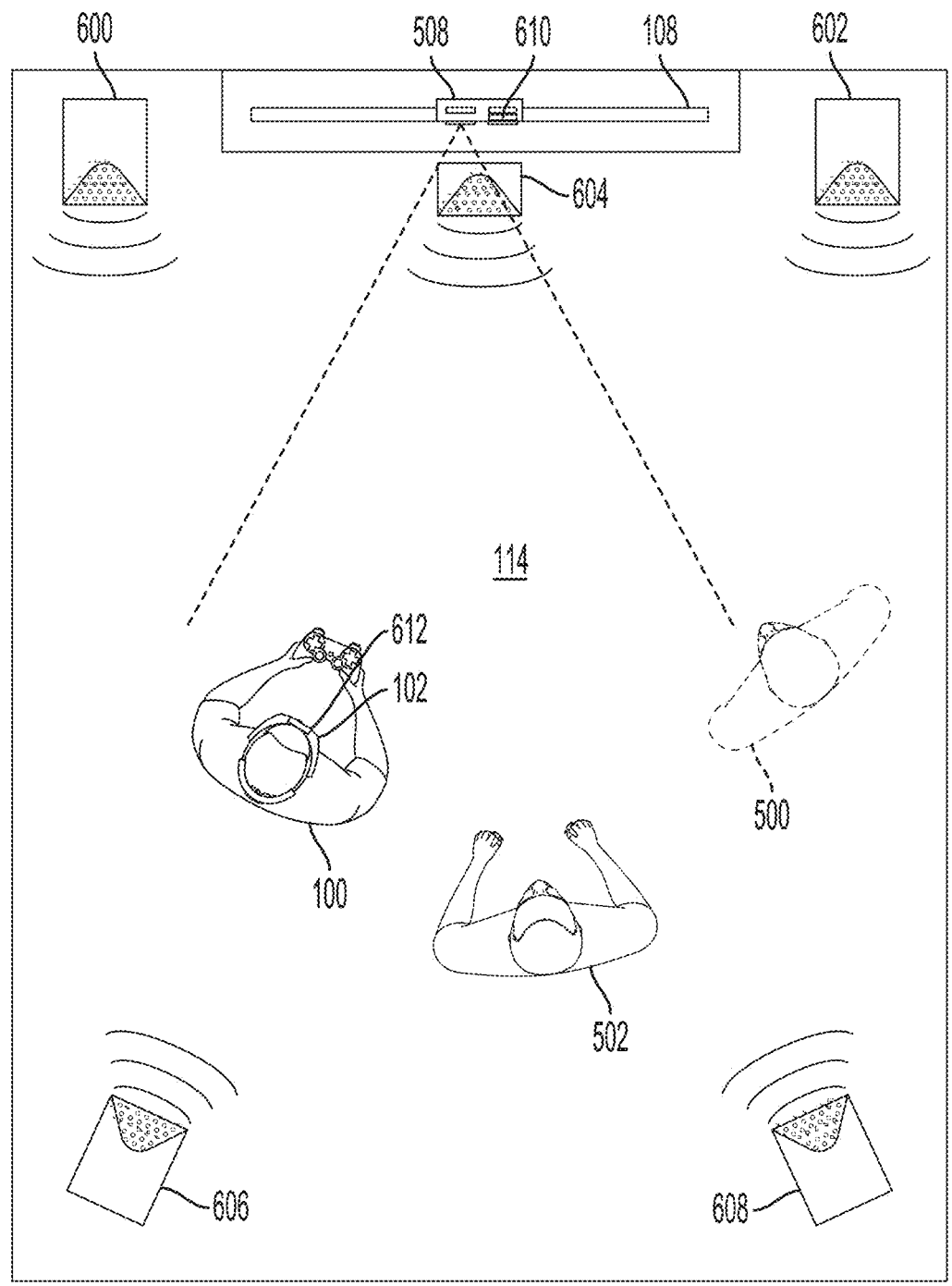
FIG. 6 conceptually illustrates an overhead view of an interactive local environment in which sound localization is employed for a virtual character, in accordance with implementations of the disclosure.

FIG. 6 conceptually illustrates an overhead view of an interactive local environment in which sound localization is employed for a virtual character, in accordance with implementations of the disclosure. As has been discussed above, the virtual character 500 is viewable through the head-mounted display 102 by the user 100, but is not viewable by the other person 502 in the local environment 114. Therefore, to enable the person 502 to comprehend the presence of the virtual character 500 in the local environment 114, sounds attributable to the virtual character 500 can be rendered through speakers so that the person 502 may hear the virtual character 500. In the Illustrated implementation, a surround sound setup of speakers is provided, including speakers 600, 602, 604, 606, and 608.

In some implementations, sound localization techniques can be employed so that the sounds which are attributable to the virtual character 500, that are played through the speakers, appear to emanate from the location of the virtual character 500 in the local environment 114.

The sound is thus directional, and even though the person 502 is not able to view the virtual character 500, the audio of the virtual character 500 is rendered such that the person 502 may infer the location of the virtual character 500 in the local environment 114. To facilitate such sound localization, in some implementations the audio of the virtual character 500 is encoded in a format supporting such sound localization. In some implementations, the computing device 106 may transmit such encoded audio data to a receiver or other device which powers or controls delivery of audio signals to the speakers.

Additionally, in some implementations audio detection can be used to aid in accurately detecting and tracking the presence of persons in the local environment 114. For example, in some implementations the image capture device 508 further includes a microphone array 610 that is capable of detecting audio in the local environment 114 and which can enable identification of sound sources and their locations in the local environment. The head-mounted display 102 mourned by the user 100 can also include a microphone array 612, which can also detect audio from the local environment 114 that can be processed to identify sound sources and their locations. Using such microphone arrays, the locations of sound sources such as the user 100 and the person 502 can be more accurately determined.

Figure 7:
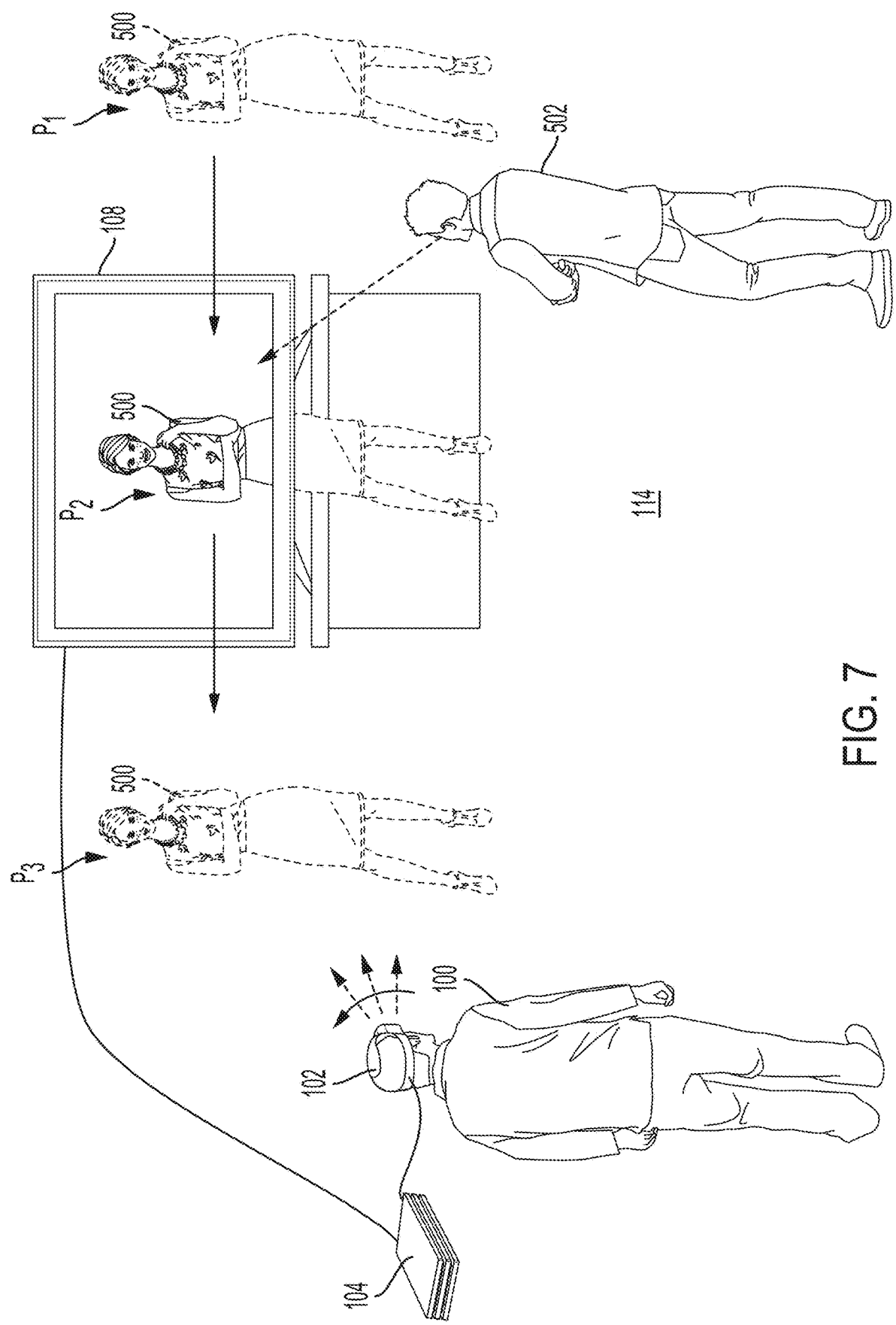
FIG. 7 illustrates a use of a display device to make a virtual character viewable in a local environment, in accordance with implementations of the disclosure.

FIG. 7 illustrates a use of a display device to make a virtual character viewable in a local environment, in accordance with implementations of the disclosure. In the illustrated implementation, at an initial time, the virtual character 500 is shown at a position P1. When at the position P1, it will be appreciated that the virtual character 500 is viewable through the head-mounted display 102 by the user 100, but is not viewable by the person 502 who is also present in the local environment 114, as the user 502 lacks a mechanism such as a head-mounted display for viewing the virtual character 500. However, in some implementations the display device 108 can be used to help the person 502 comprehend the presence of and in some cases view the virtual character 500.

By way of example, in some implementations an indicator (e.g. an arrow or other graphical pointer) can be rendered on the display device 108 that indicates the location of the virtual character 500 in the local environment 114. In some implementations, a map of the local environment 114 can be rendered to the display device 108, and the location of the virtual character 500 can be indicated on such a map.

In some implementations, if the virtual character 500 moves in proximity to the display device 108, then the virtual character 500 may be rendered on the display device 108 so that the virtual character 500 can be seen on the display device by the person 502. In the Illustrated implementation, when the virtual character 500 moves from position P1 to a position P2 that is proximate to the display device 108, so a portion of the virtual character 500 is rendered on the display device 108 in a manner suggesting its position in the local environment 114. As shown, approximately the top half of the virtual character 500 is rendered on the display device 108 such that the person 502 is able to see the virtual character 500. It will be appreciated that the virtual character 500 may further move to a position P3 in the local environment 114, and so the virtual character 500 is animated continuing moving to the left and moving off the left side of the display device 108.

As has been noted, the user 100 can view the virtual character 500 through the head-mounted display 102 regardless of its position in the local environment 114. Thus when the virtual character 500 is at the position P2, the user 100 is able to additionally see the bottom half of the virtual character 500, which is not shown on the display device 108. In some implementations, rather than seeing the virtual character 500 rendered on the display device 108, The user 100 will see the virtual character 500 rendered on the head-mounted display 102 in its entirety as an augmented reality object, which may be overlaid over the rendering of the virtual character 500 on the display device 108. In other implementations, the rendering of the portion of the virtual character 500 on the display device 108 is viewable by the user 100 through the head-mounted display 102, but is supplemented by an augmented rendering of the bottom half of the virtual character 500 via the head-mounted display 102.

Figure 8:
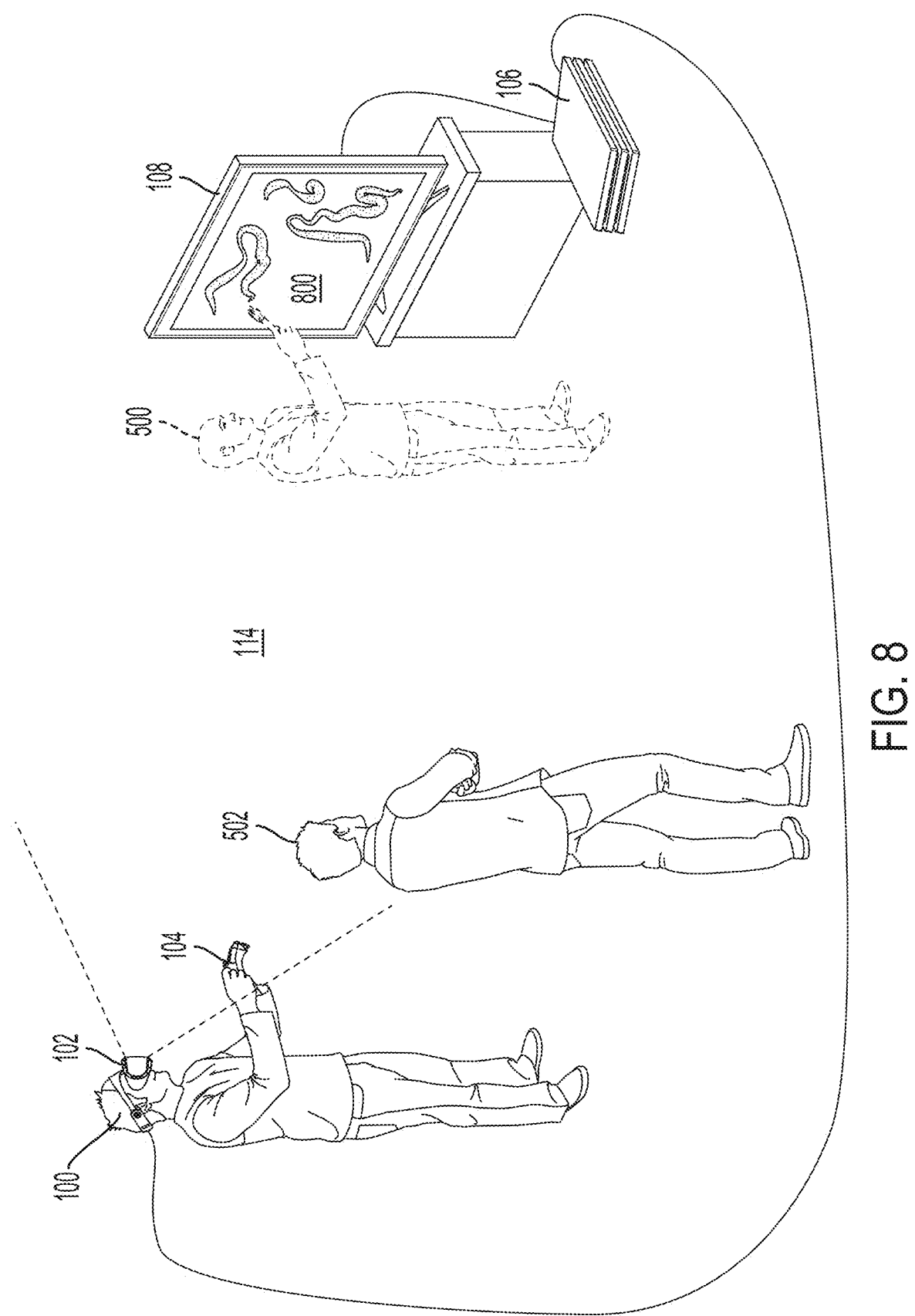
FIG. 8 illustrates a virtual character in a local environment interacting in a manner that is rendered to a display device, in accordance with implementations of the disclosure.

FIG. 8 illustrates a virtual character in a local environment interacting in a manner that is rendered to a display device, in accordance with implementations of the disclosure. As shown in the illustrated implementation, the virtual character 500 is situated in the local environment 114, so as to be viewable as an augmented reality object through the head-mounted display 102. Furthermore, in the illustrated implementation, the virtual character 500 is shown painting on the display device 108. That is, the virtual character 500 is rendered by the head-mounted display 102 in a manner showing it painting on the surface of the display device 108, and simultaneously the painting is rendered as scene 800 on the display device 108. It will be appreciated that to provide a convincing effect, the movement of a paintbrush or other drawing implement held by the virtual character 500, is coordinated with rendering of brush strokes or other elements drawn as part of the scene 800. Furthermore and in accordance with implementations herein, it will be appreciated that the painting activity by the virtual character 500 can be controlled by the user 100 via a controller device 104.

As has been discussed, the person 502 may not be able to view the virtual character 500. However, by rendering the effects of actions taken by the virtual character 500 to the display device 108, the person 502 is nonetheless able to appreciate the actions by the virtual character 500. It will be understood that the foregoing is merely one example whereby activity exhibited by the virtual character 500 effects rendering to the display device 108.

Figure 9:
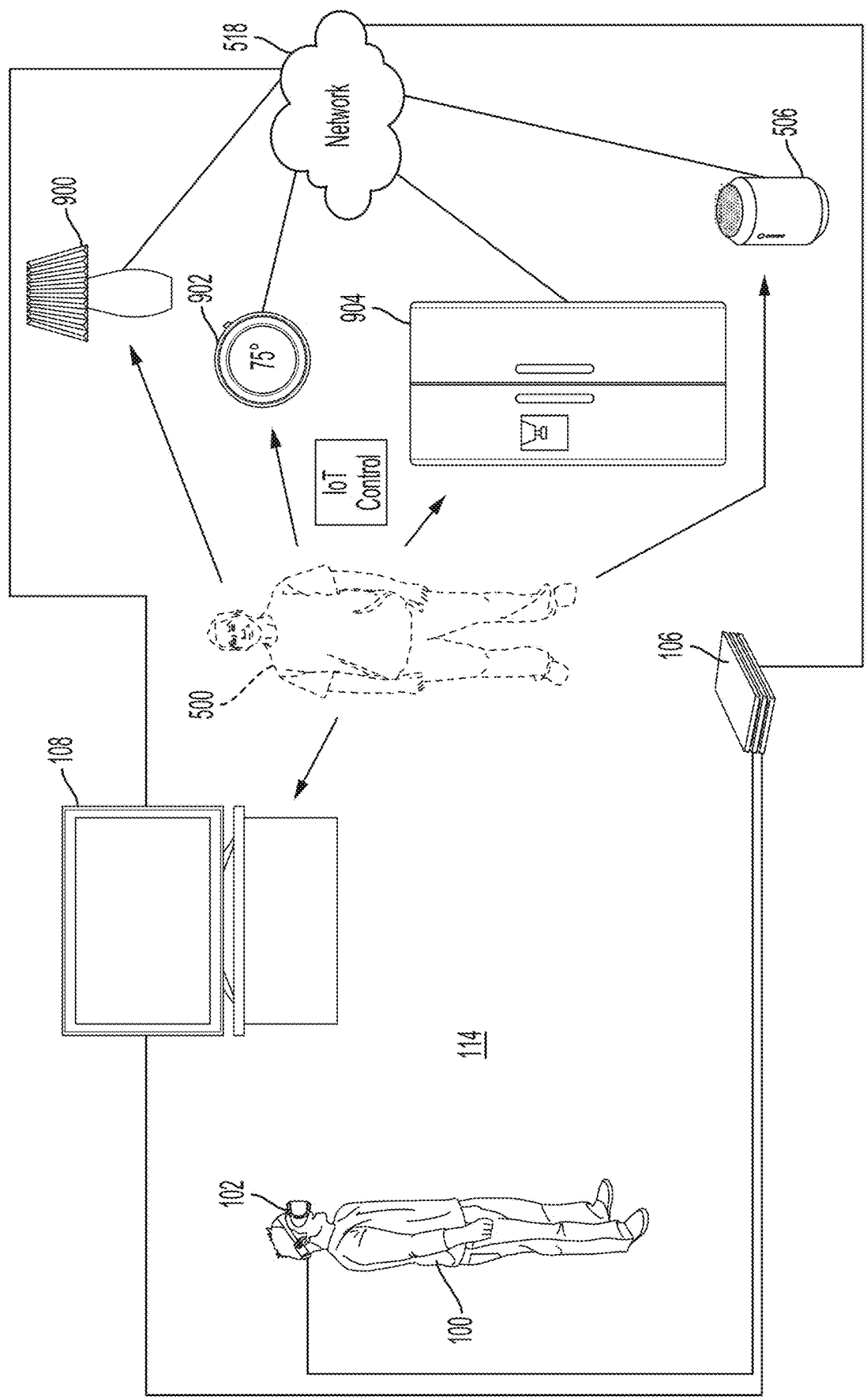
FIG. 9 illustrates a virtual character in a local environment configured to control various Internet-of-Things (TOT) devices, in accordance with implementations of the disclosure.

FIG. 9 illustrates a virtual character in a local environment configured to control various Internet-of-Things (JOT) devices, in accordance with implementations of the disclosure. As shown, the virtual character 500 in the local environment 114 can be animated so as to show the virtual character moving to and operating various IOT devices. It will be appreciated that to effect such operation of IOT devices, the computing device 106 can communicate over a network 518, which is connected to the various IOT devices. The network 518 can include a local area network, a wide area network, as well as the Internet. In some implementations, the computing device 106 communicates with the various IOT devices directly or over the network, whereas in other implementations the computing device 106 communicates over the network with a cloud-based IOT control system that in turn will issue commands to a given IOT device.

As shown in the illustrated implementation, the virtual character 500 can be animated so as to show the virtual character operating various IOT devices such as the display device 108, a lamp 900 (or a smart bulb within the lamp), a thermostat 902, a refrigerator 904, or a speaker 506 which may be a smart speaker. For example, the virtual character 500 can be animated so as to be shown turning on or turning off the display device 108, changing the channel, adjusting a setting, or changing the input. The virtual character 500 can be animated so as to turn on or turn off or adjust the color or brightness of the lamp or smart bulb 900, set or adjust its schedule, etc. The virtual character 500 can be animated to set or adjust the thermostat 902, such as adjusting the temperature up or down, or setting schedules or programming of the thermostat.

The virtual character 500 can be animated as going to the refrigerator 904 to check on its contents. It will be appreciated that in such an implementation, the animation can include an augmented animation of a virtual refrigerator door being opened, even though the actual refrigerator door is not opened. And the contents of the refrigerator can be displayed or ascertained from accessing images from a camera that is included within the refrigerator 904.

The virtual character 500 can be animated as turning on the speaker 506, for example to play music or other audio content. In some implementations, such an animation may include additional features such as showing the virtual character 500 adjusting a virtual radio dial or placing a record on a virtual turntable, etc.

It will be appreciated that these are nearly some examples of IOT devices and interactions by virtual character with such IOT devices. In other implementations, the concepts can be extended to any other type of IOT device, including by way of example without limitation, a light switch, electrical switch, security camera, security system, smart lock, coffee maker, kitchen appliance, garage door opener, etc. The virtual character 500 can be rendered in a manner showing it controlling, operating, changing settings, obtaining status information, etc. for such IOT devices in accordance with various implementations of the disclosure.

In some implementations, the virtual character 500 can be configured to respond to voice commands and gestures from the user 100 to control the IOT devices. Thus, by way of example, the user 100 may tell the virtual character 500 to turn on the lamp 900, and the user 100 may gesture towards the lamp 900, and the virtual character 500 will be shown responding by moving to the lamp 900 and turning it on, as the lamp 900 is turned on by the computing device 106 activating it over the network 518. It will be appreciated that the virtual character 500 can be configured to respond to such voice commands to control any of the other IOT devices described herein.

Furthermore, in order to show the virtual character 500 moving to locations proximate to the various IOT devices, a 3D mapping of the local environment 114 which identifies the locations of the various IOT devices is used. As noted, such a 3D mapping can be obtained using sensors included in the head-mounted display 102, such as an externally facing camera, a depth camera, and a microphone array. In order to verify the location of a given IOT device, during a setup operation, the user 100 may be requested to move proximate to the IOT device, while the IOT device is activated in some manner, such as turning it on or causing it to perform some action which can be detected and verified, for example using the sensors included in the head-mounted display 102.

In any of the implementations described herein involving a virtual character interacting in a local environment, it will be appreciated that such can be preceded by the virtual character being animated so as to appear to emerge from a display device as has been described above.

Figure 10:
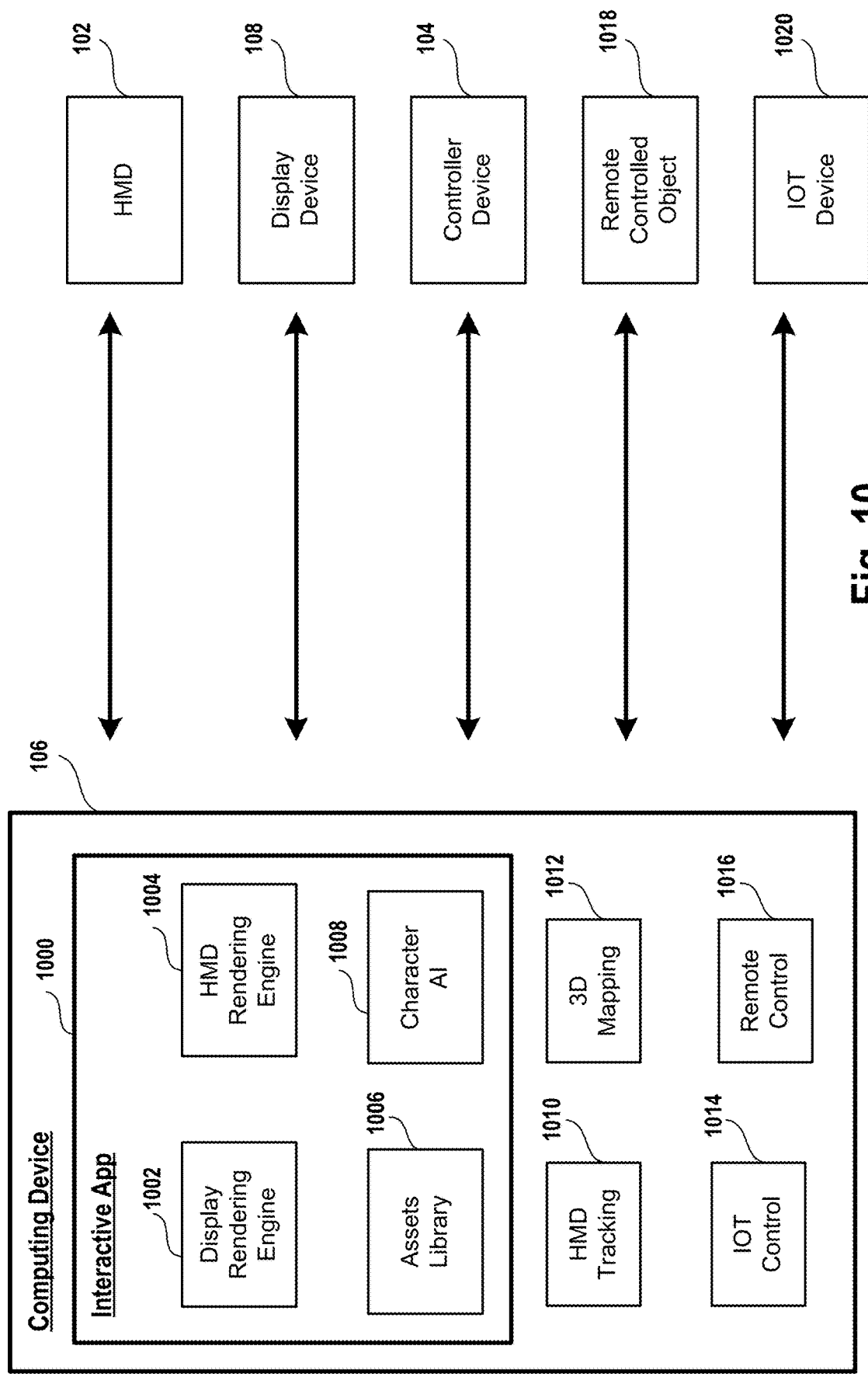
FIG. 10 conceptually illustrates a system for enabling rendering of a virtual object or virtual character on a display device and a head-mounted display, in accordance with implementations of the disclosure.

FIG. 10 conceptually illustrates a system for enabling rendering of a virtual object or virtual character on a display device and a head-mounted display, in accordance with implementations of the disclosure. As shown, the computing device 106 executes an interactive application 1000, which in some implementations may be a video game. The interactive application includes a display rendering engine 1002 that is configured to generate image frames to be rendered to the display device 108. The interactive application further includes an HMD rendering engine 1004 that is configured to generate image frames to be rendered to the head-mounted display 102. These rendering engines are configured to render the presently described virtual objects or virtual characters within given contexts, whether in a scene rendered to the display device 108, or in a local environment 114 as augmented objects displayed through the head-mounted display 102.

The interactive application 1000 further includes and assets Library 1006, which includes various art assets and other types of digital assets (e.g. audio assets) which are used for rendering the virtual objects or virtual characters in accordance with implementations of the disclosure. The interactive application 1000 further includes a character AI (artificial intelligence) module 1008, that defines an AI implementation for controlling/enabling a virtual character to respond to its environment and any detected activity therein, such as objects in the environment, movement by such objects, sounds in the environment, speech, voice commands, user gestures, etc. While the character AI module 1008 has been described with reference to virtual characters, such an AI module can also be applied for controlling the actions of a virtual object such as a vehicle.

The computing device 106 additionally implements an HMD tracking module 1010, that is configured to track the head-mounted display 102 in the local environment. It will be appreciated that this can include six degree of freedom tracking, including tracking 3D translational movements of the head-mounted display (x, y, z movements), as well as rotational movements of the head-mounted display such as pitch, roll and yaw.

The computing device 106 further implements a 3D mapping module 1012, which is configured to map the local environment in which the head-mounted display is disposed. This can entail using information from sensors of the head-mounted display 102, such as externally facing cameras, depth cameras, microphones, along with the movement tracking information to enable 3D mapping of the local environment.

The computing device 106 further implements and IOT control module 1014, which is configured to communicate with or otherwise control various IOT devices such as IOT device 1020, as has been described. For example, the IOT control module 1014 may implement one or more protocols for facilitating communication with an TOT device.

The computing device 106 additionally implements a remote control module 1016, which is configure to enable remote control of a remote controlled device 1018, as has been described above. For example, the remote control module 1016 may implement one or more protocols for facilitating communication with a remote controlled device 1018.

While the computing device 106 has generally been referenced as existing in the local environment, it will be appreciated that in various implementations, the computing device 106, or any of its functionality, can be remotely situated or be implemented at a remote server or cloud computing device/resource, and may be accessed over a network (e.g. LAN, WAN, wired, wireless, WiFi, cellular, 4G, 5G, etc.).

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queuing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("TOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 11A:
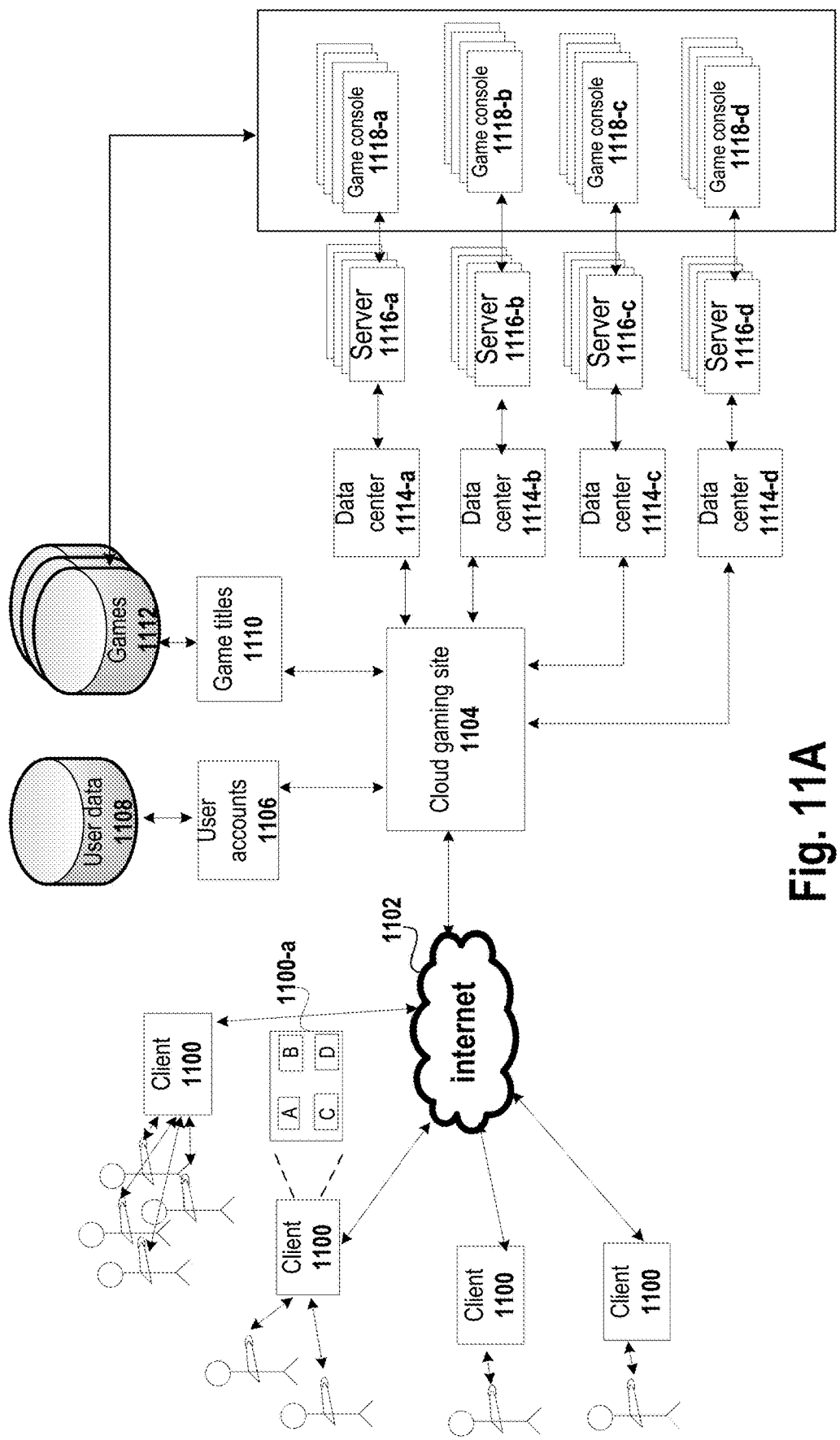
FIG. 11A illustrates an exemplary system used to load game files for a game available through a cloud gaming site, in accordance with implementations of the disclosure.

FIG. 11A illustrates an exemplary system used to load game files for a game available through a cloud gaming site. The system includes a plurality of client devices 1100 that are communicatively connected to the cloud gaming site 1104 over a network 1102, which can include a LAN, wired, wireless, cellular (e.g. 4G, 5G, etc.), or any other type of data network, including the Internet. When a request to access the cloud gaming site 1104 is received from a client device 1100, the cloud gaming site 1104 accesses user account information 1106 stored in a user data store 1108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 1110 to identify the game titles that are available at the game cloud site for the user account initiating the request. The game titles data store 1110, in turn, interacts with a games database 1112 to obtain the game titles for all the games that are available for the cloud gaming site. As new games are introduced, the games database 1112 will be updated with the game code and the game titles data store 1110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 1100-a, as shown in FIG. 11A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 11B:
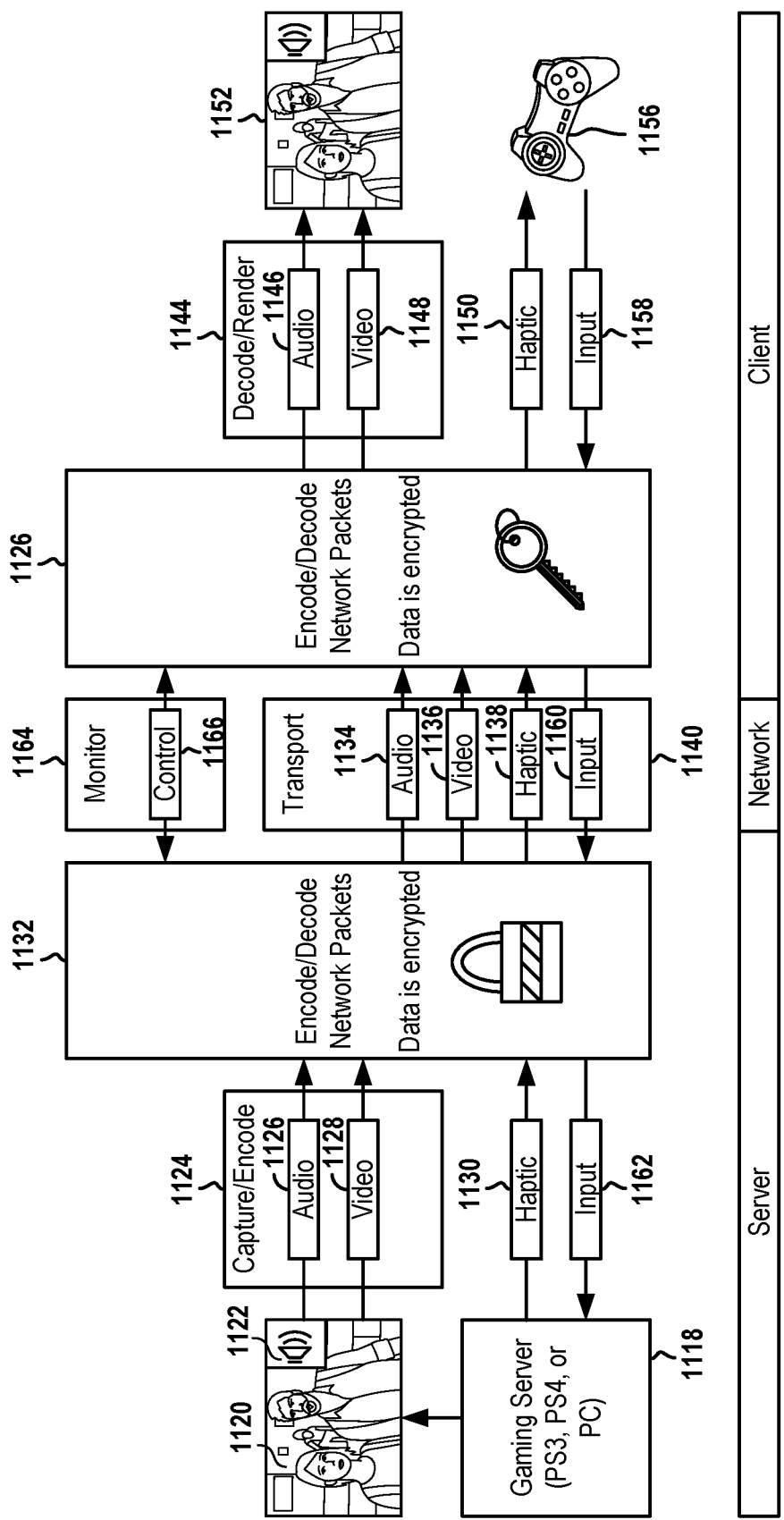
FIG. 11B is a flow diagram conceptually illustrating various operations which are performed for streaming a cloud video game to a client device, in accordance with implementations of the disclosure.

FIG. 11B is a flow diagram conceptually illustrating various operations which are performed for streaming a cloud video game to a client device, in accordance with implementations of the disclosure. The gaming system 1118 executes a video game and generates raw (uncompressed) video 1120 and audio 1122. The video 1120 and audio 1122 are captured and encoded for streaming purposes, as indicated at reference 1124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 1126 and encoded video 1128 are further packetized into network packets, as indicated at reference numeral 1132, for purposes of transmission over a network such as the Internet. The network packet encoding process can also employ a data encryption process, thereby providing enhanced data security. In the illustrated implementation, audio packets 1134 and video packets 1136 are generated for transport over the network, as indicated at reference 1140.

The gaming system 1118 additionally generates haptic feedback data 1130, which is also packetized into network packets for network transmission. In the illustrated implementation, haptic feedback packets 1138 are generated for transport over the network, as further indicated at reference 1140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 1140, the audio, video, and haptic feedback packets are transported over a network, such as and/or including the Internet.

As indicated at reference 1142, the audio packets 1134, video packets 1136, and haptic feedback packets 1138, are decoded/reassembled by the client device to define encoded audio 1146, encoded video 1148, and haptic feedback data 1150 at the client device. If the data has been encrypted, then the network packets are also decrypted. The encoded audio 1146 and encoded video 1148 are then decoded by the client device, as indicated at reference 1144, to generate client-side raw audio and video data for rendering on a display device 1152. The haptic feedback data 1150 can be processed/communicated to produce a haptic feedback effect at a controller device 1156 or other interface device through which haptic effects can be rendered. One example of a haptic effect is a vibration or rumble of the controller device 1156.

It will be appreciated that a video game is responsive to user inputs, and thus, a similar procedural flow to that described above for transmission and processing of user input, but in the reverse direction from client device to server, can be performed. As shown, a user operating controller device 1156 may generate input data 1158. This input data 1158 is packetized at the client device for transport over the network to the cloud gaming system. The input data packets 1160 are unpacked and reassembled by the cloud gaming server to define input data 1162 on the server-side. The input data 1162 is fed to the gaming system 1118, which processes the input data 1162 to update the game state of the video game.

During transport (ref. 1140) of the audio packets 1134, video packets 1136, and haptic feedback packets 1138, the transmission of data over the network can be monitored to ensure the cloud game stream quality of service. For example, network conditions can be monitored as indicated by reference 1164, including both upstream and downstream network bandwidth, and the game streaming can be adjusted in response to changes in available bandwidth. That is, the encoding and decoding of network packets can be controlled based on present network conditions, as indicated by reference 1166.

Figure 12:
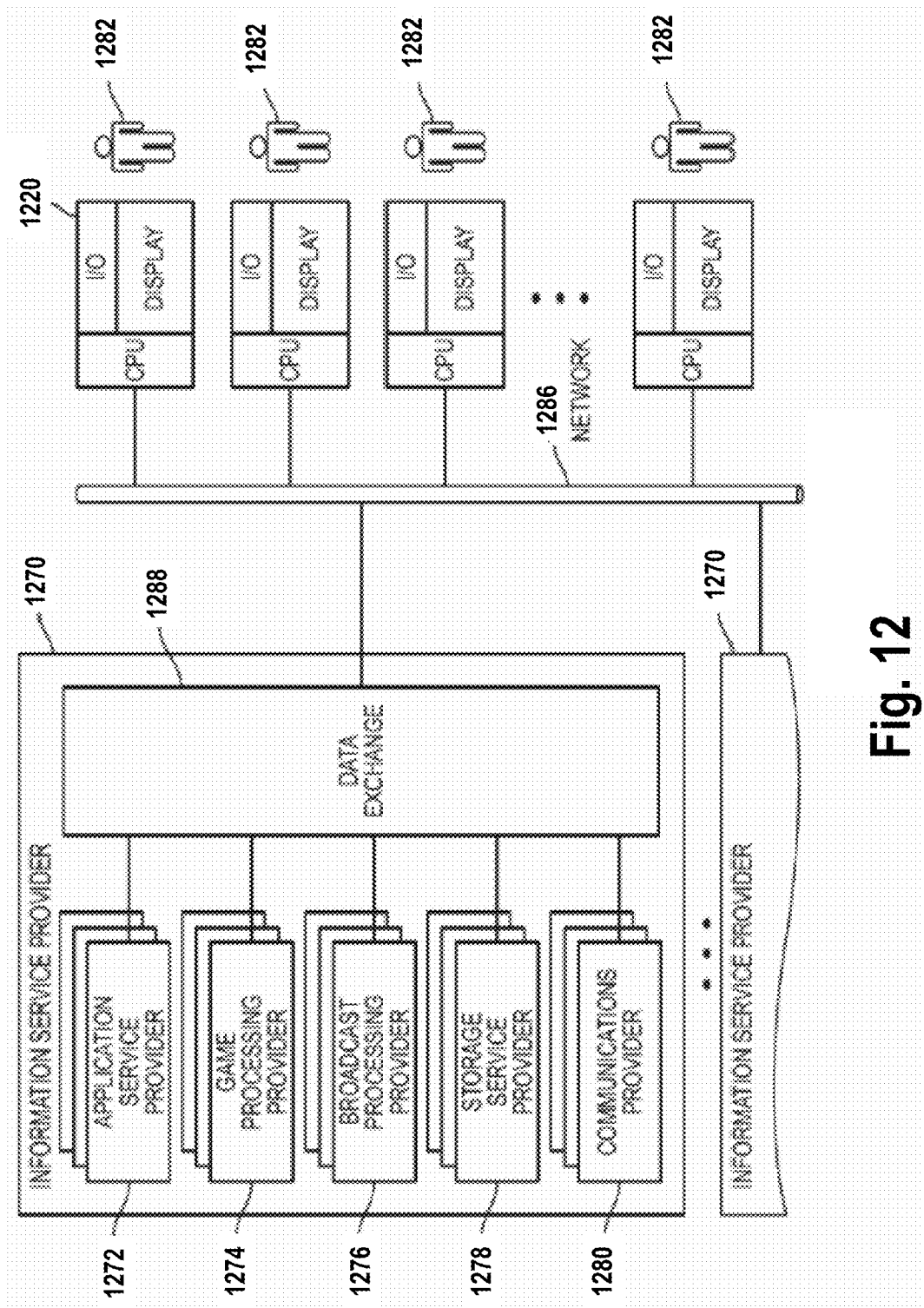
FIG. 12 illustrates an embodiment of an Information Service Provider architecture, in accordance with implementations of the disclosure.

FIG. 12 illustrates an embodiment of an Information Service Provider architecture. Information Service Providers (ISP) 1270 delivers a multitude of information services to users 1282 geographically dispersed and connected via network 1286. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1270 includes Application Service Provider (ASP) 1272, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1270 includes a Game Processing Server (GPS) 1274 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1276 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1278 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1280 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1288 interconnects the several modules inside ISP 1270 and connects these modules to users 1282 via network 1286. Data Exchange 1288 can cover a small area where all the modules of ISP 1270 are in close proximity, or can cover a large geographic area when the different modules are geographically dispersed. For example, Data Exchange 1288 can include a fast Gigabit Ethernet (or faster) within a cabinet of a data center, or an intercontinental virtual area network (VLAN).

Users 1282 access the remote services with client device 1284, which includes at least a CPU, a memory, a display and I/O. The client device can be a PC, a mobile phone, a netbook, tablet, gaming system, a PDA, etc. In one embodiment, ISP 1270 recognizes the type of device used by the client and adjusts the communication method employed. In other cases, client devices use a standard communications method, such as html, to access ISP 1270.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
   presenting on a display device a virtual scene including a virtual character associated with a game, the display device disposed in a local environment;
   providing a view of the local environment through a head-mounted display worn by a user, wherein a position of the head-mounted display identifies a position of the user in the local environment, such that the view through the head-mounted display is rendered from a first-person perspective of the user in the local environment, the view through the head-mounted display including the display device and the virtual scene being presented thereon;
   while providing the view through the head-mounted display, providing access to the game presented on the display device via a controller device that is controlled by the user of the head-mounted display, the controller device providing inputs for interaction with and control of the virtual character in the virtual scene while the virtual character is within a context of the display device;
   responsive to input via the controller device of the user, animating the virtual character to show the virtual character moving from the virtual scene presented within the context of the display device to the local environment as viewed through the head-mounted display, wherein the animating includes transitioning, from rendering the virtual character as part of the virtual scene presented within the context of the display device, to rendering the virtual character as an augmented element in the view of the local environment provided through the head-mounted display, to enable viewing and controlling of the virtual character in the local environment through the head-mounted display as rendered from the first-person perspective of the user, wherein when the transitioning of the rendering of the virtual character occurs, control of the virtual character transitions from being controlled via the controller device in the virtual scene to being controlled via the controller device in the local environment.

2. The method of claim 1, wherein the view through the head-mounted display is provided from an externally facing camera of the head-mounted display.

3. The method of claim 1, further comprising:
   generating a 3D model of the local environment;
   wherein rendering the virtual character as an augmented element in the view of the local environment includes using the 3D model of the local environment to determine placement of the virtual character in the view of the local environment.

4. The method of claim 3, wherein rendering the virtual character as an augmented element in the view of the local environment includes using the 3D model of the local environment to detect virtual collisions of the virtual character with one or more objects in the local environment.

5. The method of claim 3, wherein rendering the virtual character as an augmented element in the view of the local environment includes using the 3D model of the local environment to define permissible locations or movements of the virtual character in the view of the local environment.

6. The method of claim 3, wherein generating the 3D model of the local environment includes scanning the local environment with a depth sensing device of the head-mounted display.

7. The method of claim 1, wherein the transitioning includes, identifying the display device in the view of the local environment, and rendering the virtual character in proximity to the display device in the view of the local environment.

8. The method of claim 7, wherein rendering the virtual character in proximity to the display device includes animating the virtual character in the view of the local environment as emerging from the display device into the local environment.

9. The method of claim 1, wherein the transitioning includes, identifying in the view of the local environment the virtual scene that is presented on the display device, and rendering the virtual character in proximity to the virtual scene in the view of the local environment.

10. A non-transitory computer readable medium having program instructions that, when executed by a computing device, cause said computing device perform a method including the following:
    presenting on a display device a virtual scene including a virtual character associated with a game, the display device disposed in a local environment;
    providing a view of the local environment through a head-mounted display worn by a user, wherein a position of the head-mounted display identifies a position of the user in the local environment, such that the view through the head-mounted display is rendered from a first-person perspective of the user in the local environment, the view through the head-mounted display including the display device and the virtual scene being presented thereon;
    while providing the view through the head-mounted display, providing access to the game presented on the display device via a controller device that is controlled by the user of the head-mounted display, the controller device providing inputs for interaction with and control of the virtual character in the virtual scene while the virtual character is within a context of the display device;
    responsive to input via the controller device of the user, _animating the virtual character to show the virtual character moving from the virtual scene presented within the context of the display device to the local environment as viewed through the head-mounted display, wherein the animating includes transitioning, from rendering the virtual character as part of the virtual scene presented within the context of the display device, to rendering the virtual character as an augmented element in the view of the local environment provided through the head-mounted display, to enable viewing and controlling of the virtual character in the local environment through the head-mounted display as rendered from the first-person perspective of the user, wherein when the transitioning of the rendering of the virtual character occurs, control of the virtual character transitions from being controlled via the controller device in the virtual scene to being controlled via the controller device in the local environment.

11. The non-transitory computer readable medium of claim 10, wherein the view through the head-mounted display is provided from an externally facing camera of the head-mounted display.

12. The non-transitory computer readable medium of claim 10, further comprising:
generating a 3D model of the local environment;
wherein rendering the virtual character as an augmented element in the view of the local environment includes using the 3D model of the local environment to determine placement of the virtual character in the view of the local environment.

13. The non-transitory computer readable medium of claim 12, wherein rendering the virtual character as an augmented element in the view of the local environment includes using the 3D model of the local environment to detect virtual collisions of the virtual character with one or more objects in the local environment.

14. The non-transitory computer readable medium of claim 12, wherein rendering the virtual character as an augmented element in the view of the local environment includes using the 3D model of the local environment to define permissible locations or movements of the virtual character in the view of the local environment.

15. The non-transitory computer readable medium of claim 12, wherein generating the 3D model of the local environment includes scanning the local environment with a depth sensing device of the head-mounted display.

16. The non-transitory computer readable medium of claim 10, wherein the transitioning includes, identifying the display device in the view of the local environment, and rendering the virtual character in proximity to the display device in the view of the local environment.

17. The non-transitory computer readable medium of claim 16, wherein rendering the virtual character in proximity to the display device includes animating the virtual character in the view of the local environment as emerging from the display device into the local environment.

18. The non-transitory computer readable medium of claim 10, wherein the transitioning includes, identifying in the view of the local environment the virtual scene that is presented on the display device, and rendering the virtual character in proximity to the virtual scene in the view of the local environment.

* * * * *